(12) United States Patent
Sanderson et al.

(10) Patent No.: US 8,783,604 B2
(45) Date of Patent: Jul. 22, 2014

(54) AIRCRAFT WING WITH KNUCKLED RIB STRUCTURE

(75) Inventors: Terry M. Sanderson, Tucson, AZ (US); Michael S. Cherry, Tucson, AZ (US); Jack W. Reany, Corona de Tucson, AZ (US)

(73) Assignee: Raytheon Company, Waltham, MA (US)

( * ) Notice: Subject to any disclaimer, the term of this patent is extended or adjusted under 35 U.S.C. 154(b) by 137 days.

(21) Appl. No.: 13/278,477

(22) Filed: Oct. 21, 2011

(65) Prior Publication Data
US 2013/0099050 A1 Apr. 25, 2013

(51) Int. Cl.
*B64C 3/56* (2006.01)

(52) U.S. Cl.
CPC ............ *B64C 3/56* (2013.01); *B64C 2201/102* (2013.01)
USPC .. 244/49; 244/123.1; 244/123.8; 244/123.14; 244/219; 244/87

(58) Field of Classification Search
USPC .............. 244/123.1, 123.8, 123.14, 210–217, 244/219, 87
See application file for complete search history.

(56) References Cited

U.S. PATENT DOCUMENTS

| | | | | |
|---|---|---|---|---|
| 4,059,247 A | * | 11/1977 | Prewitt | 244/7 R |
| 4,247,066 A | * | 1/1981 | Frost et al. | 244/219 |
| 4,336,914 A | * | 6/1982 | Thomson | 244/46 |
| 4,588,146 A | * | 5/1986 | Schaeffel et al. | 244/3.27 |
| 5,320,491 A | * | 6/1994 | Coleman et al. | 416/24 |
| 5,531,407 A | * | 7/1996 | Austin et al. | 244/219 |
| 6,190,484 B1 | * | 2/2001 | Appa | 156/189 |
| 6,684,593 B2 | * | 2/2004 | Brenneis et al. | 52/630 |
| 6,796,534 B2 | * | 9/2004 | Beyer et al. | 244/214 |
| 6,905,093 B2 | | 6/2005 | Dryer et al. | |
| 7,338,018 B2 | * | 3/2008 | Huynh et al. | 244/215 |
| 7,728,267 B2 | | 6/2010 | Sanderson et al. | |
| 7,828,250 B2 | * | 11/2010 | Wheaton et al. | 244/214 |
| 7,939,178 B2 | | 5/2011 | Sar et al. | |
| 8,245,982 B2 | * | 8/2012 | Vormezeele et al. | 244/214 |
| 8,262,032 B2 | * | 9/2012 | Sanderson et al. | 244/219 |
| 2002/0100842 A1 | * | 8/2002 | Perez | 244/219 |
| 2006/0163423 A1 | | 7/2006 | Parine et al. | |
| 2009/0072093 A1 | * | 3/2009 | Fox et al. | 244/214 |
| 2009/0166477 A1 | * | 7/2009 | Bousfield | 244/218 |
| 2009/0283643 A1 | | 11/2009 | Sar et al. | |

(Continued)

OTHER PUBLICATIONS

Application as filed from related U.S. Appl. No. 12/843,921, filed Jul. 27, 2010.

*Primary Examiner* — Luke Ratcliffe
*Assistant Examiner* — Assres H Woldemaryam
(74) *Attorney, Agent, or Firm* — Renner, Otto, Boisselle & Sklar, LLP

(57) ABSTRACT

An aircraft wing has hinged ribs, and a skin covering the ribs. The ribs each include plural rib sections, array from the leading edge of the wing, to the trailing edge of the wing, and a lock to hold the rib sections together in a deployed state or condition. The wings are initially in a stowed state, with the ribs and the rib sections having a curved chord, and deploy to the deployed state, in which the ribs have a straightened chord that defines an airfoil state. The wing may have foam material between the ribs to allow the wings to expand in the wingspan direction, for instance after the ribs have been placed in the deployed state.

17 Claims, 3 Drawing Sheets

(56) References Cited

U.S. PATENT DOCUMENTS

| | | |
|---|---|---|
| 2009/0283936 A1 | 11/2009 | Sanderson et al. |
| 2009/0286101 A1* | 11/2009 | Sar et al. ............... 428/613 |
| 2010/0025537 A1* | 2/2010 | Wheaton et al. ............ 244/214 |
| 2010/0127130 A1 | 5/2010 | Eisentraut et al. |
| 2010/0163685 A1* | 7/2010 | Vormezeele et al. ......... 244/214 |
| 2010/0288870 A1 | 11/2010 | Geswender et al. |
| 2011/0024575 A1* | 2/2011 | Wheaton et al. ............ 244/214 |
| 2011/0127387 A1* | 6/2011 | Morris ..................... 244/216 |
| 2012/0048993 A1* | 3/2012 | Velez ..................... 244/3.28 |
| 2012/0234983 A1* | 9/2012 | Wildman ................... 244/215 |

\* cited by examiner

AIRCRAFT WING WITH KNUCKLED RIB STRUCTURE

BACKGROUND OF THE INVENTION

1. Field of the Invention

The invention is in the field of deployable wings, and in aircraft having deployable wings.

2. Description of the Related Art

Aircraft launched from tubes or other devices may be severely limited in wing size and/or configuration, because of the need for the wings to fit within the launcher envelope. This limitation on wings limits the performance of tube-launched or other deployable aircraft. Improvement in deployable wings would therefore be desirable.

SUMMARY OF THE INVENTION

According to an aspect of the invention, a wing has ribs made up of hinged rib sections.

According to another aspect of the invention, a wing has hinged ribs, and a skin over at least part of the ribs.

According to yet another aspect of the invention, a wing has a chord that hinges or folds to curve the wing for storage in a stowed state, such as against a fuselage.

According to still another aspect of the invention, a wing deploys from a stowed state to a deployed state by straightening its chord. The wing may also telescope in moving from its stowed state to the deployed state, increasing its span. The wing may have ribs with hinged rib sections that align in the deployed state. A lock mechanism, such as a series of pins coupled together by springs, with the pins engaging holes in the rib sections, may be used to lock the rib sections together in the deployed state. The pins of the lock mechanism may be tapered pins that engage tapered holes in the rib sections.

According to yet another aspect of the invention, an aircraft wing includes: plural hinged ribs that are coupled together. Each of the hinged ribs includes plural rib sections that are hingedly coupled together; and a lock. For each of the ribs the rib can be in a stowed state, with a curved chord, or a deployed state, with the rib sections locked together with the lock, and the rib having a straightened chord.

According to still another aspect of the invention, an aircraft includes: a fuselage; and wings operatively coupled to the fuselage. The aircraft has the wings initially in a stowed state, with each of the wings wrapped partially around the fuselage, with hinged rib sections of ribs of the wings curved around the fuselage. The wings deploy to a deployed state, with the hinged rib sections of the ribs providing straightened chords to the wings.

According to yet another aspect of the invention, a method of deploying an aircraft includes: launching the aircraft, wherein wings of the aircraft are in a stowed state during launch; and after the launching and during flight, deploying the wings from the stowed state to a deployed state, wherein the deploying includes, for each of the wings, aligning hinged rib sections of ribs of the wing.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

DETAILED DESCRIPTION

An aircraft wing has hinged ribs, and a skin covering the ribs. The ribs each include plural rib sections, arrayed from the leading edge of the wing, to the trailing edge of the wing, and a lock to hold the rib sections together in a deployed state or condition. The wings are initially in a stowed state, with the ribs and the rib sections having a curved chord, and deploy to the deployed state, in which the ribs have a straightened chord that defines an airfoil state. The wing may have foam material between the ribs to allow the wings to expand in the wingspan direction, for instance after the ribs have been placed in the deployed state.

Figure 1:
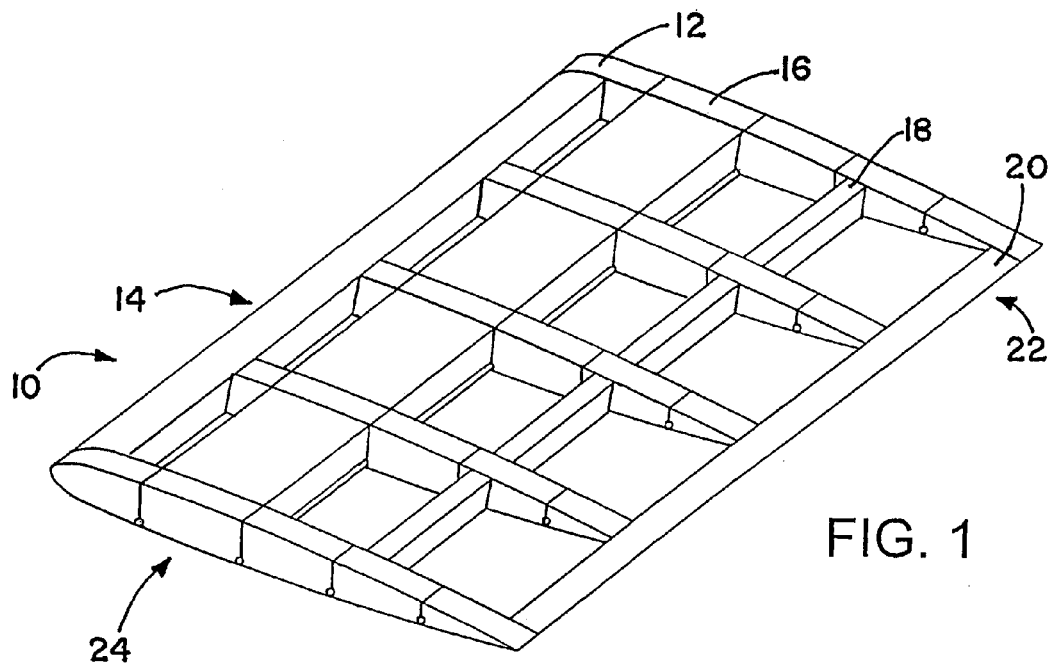
FIG. 1 is an oblique view of part of an aircraft wing in accordance with an embodiment of the present invention.

FIG. 1 shows an aircraft wing 10 that can be deployed from a stowed state to a deployed state. The wing 10 includes a forward stringer 12 at a leading edge 14 of the wing 10, a central spar 16, an aft stringer 18 behind the spar 16, and a trailing edge piece 20 at a trailing edge 22 of the wing 10. The wing 10 also includes a series of ribs 24 that are attached to the stringers 12 and 18, the spar 16, and the trailing edge 22. The ribs 24 extend along the chord of the wing 10, from the leading edge 14 to the trailing edge 22.

Figure 2:
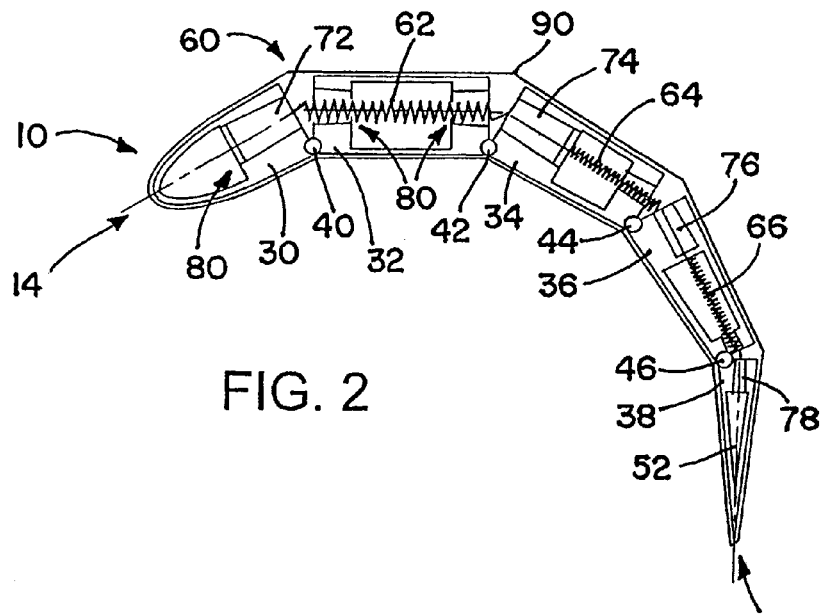
FIG. 2 is a side view of the wing of FIG. 1, with the wing in the stowed state.
Figure 3:
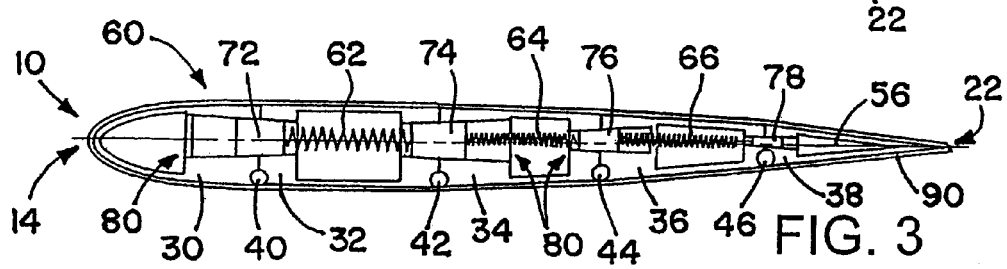
FIG. 3 is a side view of the wing of FIG. 1, with the wing in the deployed state.

With reference now in addition to FIGS. 2 and 3, the ribs 24 are each made up of a series of rib sections 30, 32, 34, 36, and 38. The rib sections 30-38 are hingedly coupled together at a series of hinge joints 40, 42, 44, and 46. FIG. 2 shows one of the ribs 24 in a stowed condition or state, with the rib sections 30-38 pivoted relative to one another to produce a curved (non-straight) chord 52 through their centers. FIG. 3 shows the rib 24 in a deployed state or condition, with the rib sections 30-38 aligned with one another to produce a substantially straight chord 56 through their centers. The rib sections 30-38 combine to produce an airfoil shape in the rib 24, when the rib 24 is in the deployed state.

The forward-most rib sections 30 are each attached to the forward stringer 12. Central rib sections 32 are each attached to the central spar 16. Aft rib sections 36 are each attached to the aft stringer 18. Trailing edge rib sections 38 are each attached to the trailing edge piece 20. Other configurations are possible.

There are five rib sections 30-38 in each of the ribs 24 of the illustrated embodiment. A greater or lesser number of rib sections may be used in alternative.

A lock mechanism 60 may be used to maintain the rib 24 in its deployed state, once the rib 24 reaches the deployed state. In the illustrated embodiment the lock mechanism 60 is a series of springs and pins that operate together to secure the rib 24 once it reaches the deployed state, preventing the rib sections 30-38 from rotating relative to one another about the hinge joints 40-46. This prevents the rib 24 from moving back toward the stowed state, once it has reached the deployed state. The lock 60 may take any of a variety of forms, one of which is shown in FIGS. 2 and 3.

The lock 60 shown in the illustrated embodiment has a series of springs 62, 64, and 66, connected to pins 72, 74, 76, and 78. The spring 62 is between and connected to the pins 72 and 74, the spring 64 is between and connected to the pins 74 and 76, and the spring 66 is between and connected to the pins 76 and 78. The springs 62-66 and the pins 72-78 run through a series of holes 80 in the middles of the rib sections 30-38. The sections 30-38 are locked in place when the pins 72-78 are located respective pairs of the holes 80 in adjacent of the rib sections 30-38. In the deployed state the pin 72 locks together the sections 30 and 32, the pin 74 locks together the sections 32 and 34, the pin 76 locks together the sections 34 and 36, and the pin 78 locks together the sections 36 and 38.

The springs 62-66 provide a flexible connection for the pins 72-78, allowing the pins 72-78 to separate from one another in order to have the rib 24 in the curved, stowed state shown in FIG. 2. In such a stowed state the springs 62-66 are stretched, since the curved chord 52 (FIG. 2) is longer than the straight chord 56 (FIG. 3). Therefore in the stowed state the springs 62-66 may be biased to provide a motive force to transform the wing 10 from the stowed state (curved chord) to the deployed state (straight chord).

The pins 62-66 may be tapered in the direction of their longitudinal axes, for example with a taper that corresponds to tapering of the holes 80 between the rib sections 30-38. The taper helps prevent lash (play) in the mechanism that holds together the rib sections 30-38. With tapered pins engaging tapered holes, there is no need to precisely control the diameters of the pins 62-66 and the holes 80, in order to prevent play in the lock mechanism 60. The taper may be a taper of 1 to 7 degrees, for example.

A wide variety of other lock mechanisms are possible. For example the rib sections 30-38 may have latches that automatically engage when the rib sections 30-38 are put into line in the deployed configuration. Adhesives or other adhering surfaces may also be used to maintain the configuration of the rib sections 30-38 once the rib sections 30-38 come into contact with one another.

The rib sections 30-38 may be made of any of a variety of suitable materials, such as moldable plastics or metals such as aluminum. The pins 62-66 may also me molded out of plastic, or made of metal. A suitable plastic material is glass-filled polyetherimide (PEI). The springs 62-66 may be standard metal coil springs.

The ribs 24 may be covered by at least in parts by a skin 90 that forms an outer surface of at least part of the wing 10. The skin 90 may be made of a flexible material that is able to change shape as the wing 10 deploys from the stowed state to the deployed state. The skin 90 may be made from a flexible metal, such as spring steel, or may be made from a suitable non-metal material, such as a flexible plastic.

Figure 4:
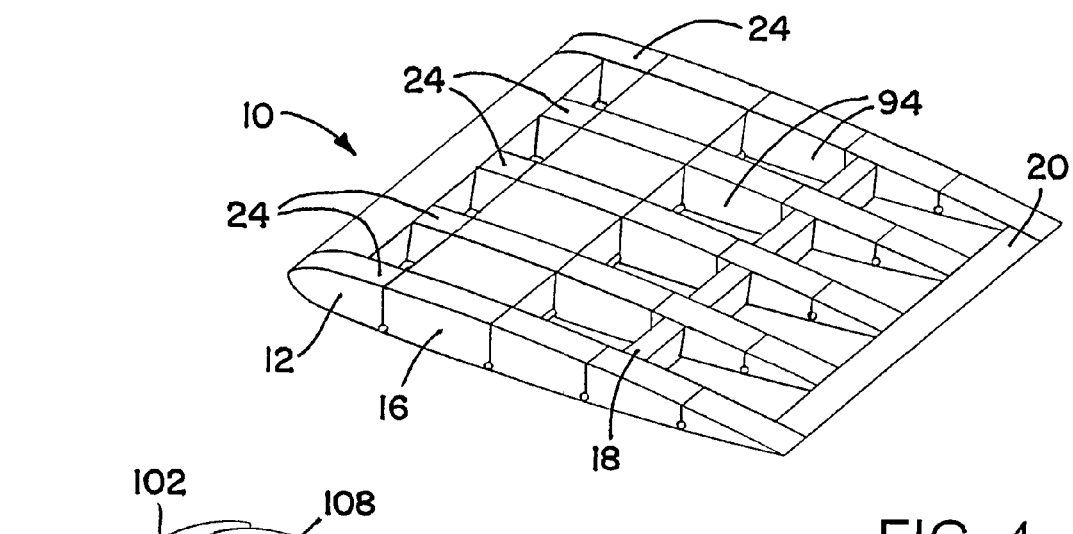
FIG. 4 is an oblique view of an aircraft wing in accordance with an alternate embodiment of the present invention.

With reference now in addition to FIG. 4, the wing 10 may have foam material 94 between the ribs 24. The foam material 94 may be compressed, as is shown in FIG. 4, when the wing 10 is in the stowed condition. This allows the wing 10 in the stowed condition to have a smaller span, as well as having a curved chord. The stringers 12 and 18, the central spar 16, and/or the trailing edge piece 20 may be telescoping structures or structures otherwise able to change their lengths, in order to accommodate the changes in span of the wing 10. The foam material 94 may be a shape memory foam that preferentially regains an expanded shape, corresponding to that of the wing 10 in its deployed state, when no longer constrained to be maintained in the stowed state. Shape memory foam materials have the advantageous property of retaining a preferred shape, such as an expanded shape, over a long period of storage time. Thus the foam material 94 may be stored in a compressed state, as part of the wing 10 in the stowed state, while still retaining the ability to on its own regain and maintain its expanded state, such as as part of the wing 10 in the deployed state. The foam material 94 may thus provide a motive force for the increase in span resulting from deployment of the wing 10. Alternatively or in addition, the force for increasing the span of the wing 10 may be provided by actuatable expandable structures, for example the stringers 12 and 18, the central spar 16, and/or the trailing edge piece 20. As another alternative, the foam material 94 may be heated, or subject to electrical and/or magnetic forces, in order to cause or facilitate its expansion.

The foam material 94 may be a polyurethane-based material, an epoxy-based material, or a cyanate-ester-based material, for example. Further information regarding use of foams in telescoping wings and other structures may be found in co-owned U.S. Pat. Nos. 7,939,178 and 7,728,267, and in co-owned U.S. Published Applications 2009/0283643 and 2009/0283936. The specifications and figures of these patents and published applications are incorporated herein by reference. The skin 90 may be part of the foam material.

As an alternative the foam material 94 may be used as a filler material for a wing that does not change span. Also, other sorts of material may be used as a filler, or the wing 10 may be hollow, with no material at least portions of the spaces between the ribs 24.

Figure 5:
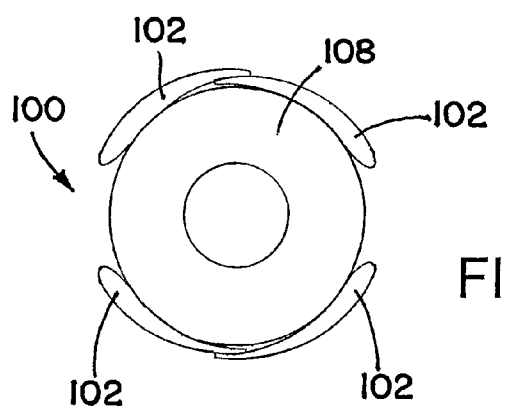
FIG. 5 is a front view of an aircraft with wings that are in a deployed state, in accordance with another alternate embodiment of the present invention.
Figure 6:
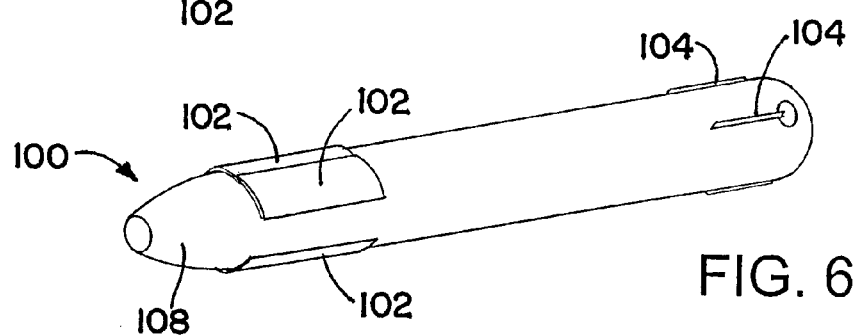
FIG. 6 is an oblique view of the aircraft of FIG. 5.
Figure 7:
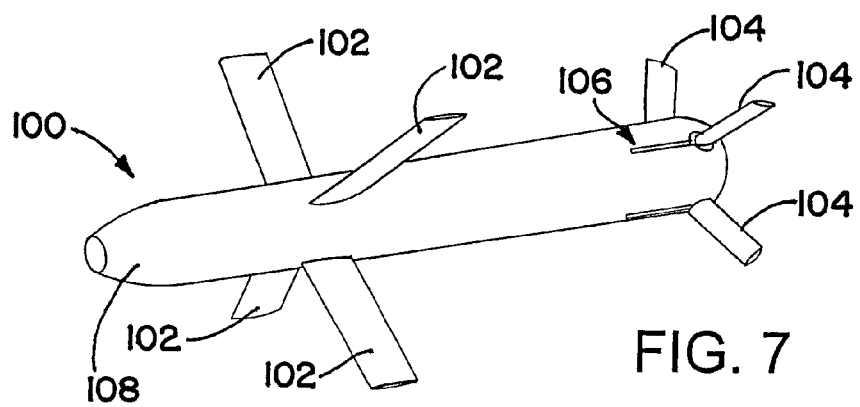
FIG. 7 is an oblique view of the aircraft of FIG. 5, with the wings in the deployed state.

FIGS. 5-7 illustrate an example of an aircraft 100, such as a missile or an unmanned aerial vehicle (UAV), that includes four wings 102 that may be similar in configuration and features to the wing 10 (FIG. 1). The aircraft 100 also has tail fins 104 that deploy from slots 106 in a fuselage 108. The wings 102 may overlap in pairs when in the stowed condition (FIGS. 5 and 6). In an unloaded condition the wings 102 may naturally be in the deployed condition (FIG. 7). Putting the wings 102 into the stowed condition may result in a resilient force that automatically results in the wings 102 attaining the deployed condition as soon as the aircraft 100 exits the launch tube or other launcher. The wing 100 may be deployed in a process that not only takes it from the stowed state to the deployed state, but also rotates the wing 100 to put it into the desired orientation relative to the fuselage 108. Examples of deployment mechanisms for accomplishing the desired change in orientation are shown in co-owned U.S. Pat. Nos. 6,905,093 and 7,642,492, the descriptions and figures of which are incorporated by reference herein. Further details regarding such deployment mechanisms are omitted from further discussion. The deployment mechanism for changing orientation may also be driven by resilient forces.

As an alternative, the wings 102 of the aircraft 100 may be deployed prior to launch, and/or the aircraft 100 may be launched from other than a launch container. For example the aircraft may have its wings 102 kept in the stowed state during shipping and storage in an appropriate container. The wings 102 may be deployed prior to, during, or after launch.

Figure 8:
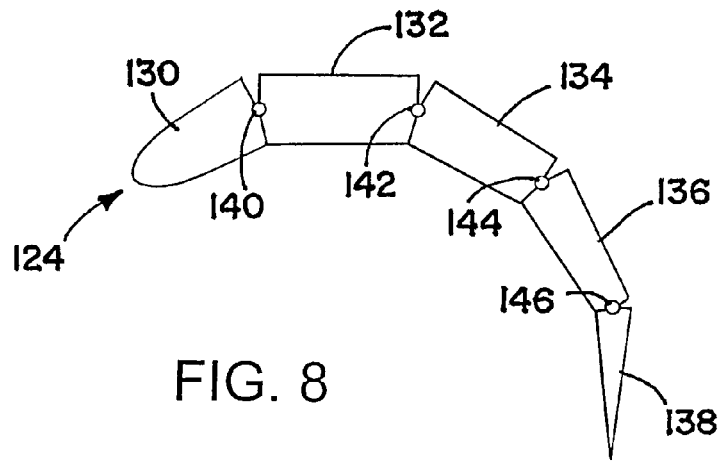
FIG. 8 is a side view of a rib, in a stowed state, usable in an aircraft wing in accordance with yet another alternate embodiment of the invention.
Figure 9:
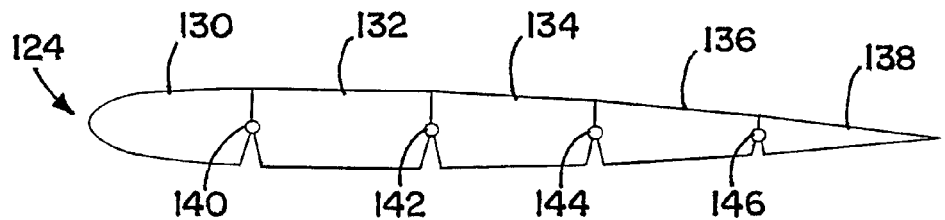
FIG. 9 is a side view of the rib of FIG. 8.

FIGS. 8 and 9 illustrate an alternative embodiment, a rib 124 having rib sections 130, 132, 134, 136, and 138 that are hinged in the middle, rather than at the bottom. In such a configuration the hinge line of hinge joints 140, 142, 144, and 146 corresponds with the chord line of the wing of which the rib 124 is part. In other aspects the wing of which the rib 124 is a part may be similar to the wing 10 (FIG. 1) described above.

Figure 10:
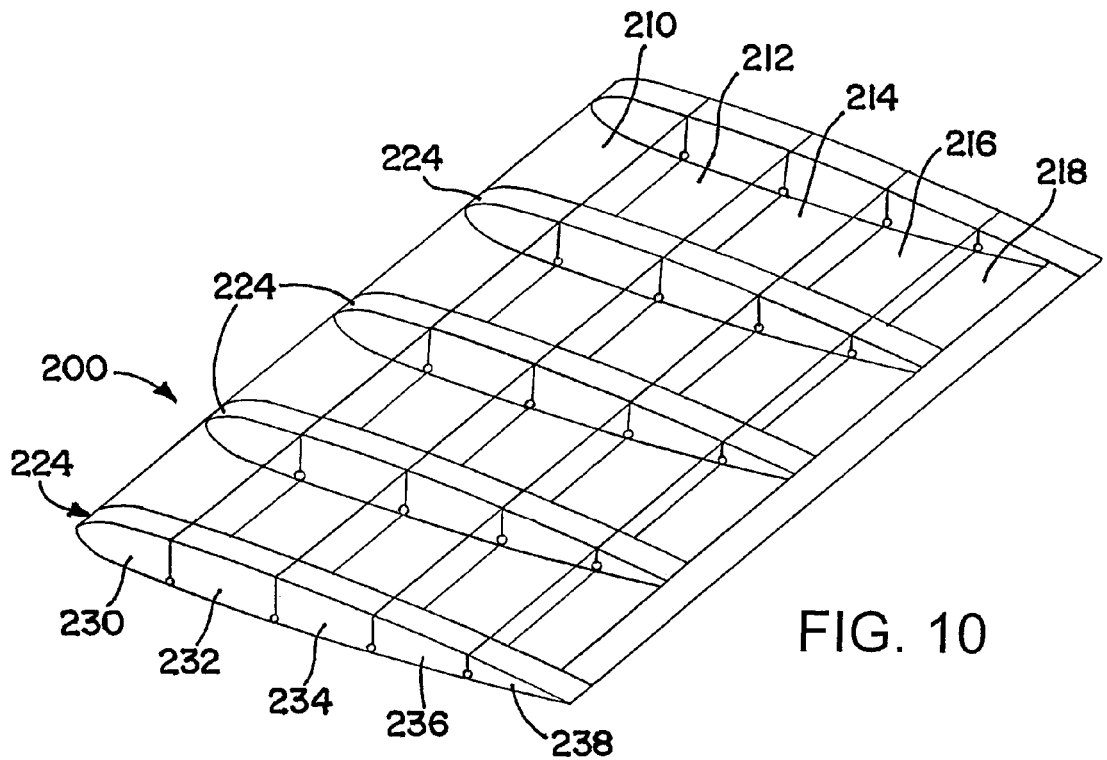
FIG. 10 is an oblique view of an aircraft wing in accordance with still another alternate embodiment of the invention.

FIG. 10 shows an alternative wing 200 which has a series of hinged segments 210, 212, 214, 216, and 218. The hinged segments 210-218 are supported by a series of ribs 224, each of which have a series of hinged rib sections 230, 232, 234, 236, and 238, which correspond to respective of the hinged segments 210-218. The hinged segments 210-218 move as discrete units, with the hinged rib sections of each of the segments 210-218 pivoting relative to the adjacent segments.

Wings such as those described above advantageously allow use of larger wings than may be possible for wings that do not have their chords wrapped around a fuselage. The space savings may go beyond chord wrapping, to including telescoping as well.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An aircraft wing comprising:
   plural hinged ribs that are coupled together; and
   wherein each of the hinged ribs includes:
      plural rib sections that are hingedly coupled together; and
      a lock; and
   wherein for each of the ribs, the rib can be in a stowed state, with a curved chord, or a deployed state, with the rib sections locked together with the lock, and the rib having a straightened chord;
   wherein the lock includes springs and pins, with the springs and pins running through a series of holes through the rib sections, with the springs and the pins of each of the locks coupled together in series; and
   wherein the springs pull the pins in place within the holes in the rib sections, causing the pins to move from locations in single of the rib sections when the ribs are in the stowed state, to locations where the pins span pairs of rib sections when the pins are in the deployed state, to maintain the ribs in the deployed state.

2. The aircraft wing of claim 1, further comprising a flexible skin covering at least parts of the ribs.

3. The aircraft wing of claim 1, further comprising a foam material between the ribs.

4. The aircraft wing of claim 3, wherein the foam material is a shape memory foam material.

5. The aircraft wing of claim 3,
   wherein the foam material is relatively compressed when the wing is in the stowed state; and
   wherein the foam material is relatively expanded when the wing is in the deployed state, with the wing having a longer span in the deployed state than in the stowed state.

6. The aircraft wing of claim 1, wherein the plural rib sections include at least five rib sections per rib.

7. The aircraft wing of claim 1, wherein the pins are tapered pins and the holes that the pins engage are tapered holes.

8. The aircraft wing of claim 1, wherein the springs are coil springs.

9. The aircraft wing of claim 1,
   wherein the wing has an airfoil shape when the wings are in the deployed state; and
   wherein the wing does not have the airfoil shape when the wings are in the stowed state.

10. The aircraft wing of claim 1,
    further comprising a fuselage;
    wherein the wing is mechanically coupled to the fuselage.

11. The aircraft wing of claim 10, wherein in the stowed state the wing is wrapped around part of the fuselage.

12. The aircraft wing of claim 1,
    wherein the wing also comprises:
       a forward stringer at a leading edge of the wing;
       an aft stringer; and
       a central spar that is between the forward stringer and the aft stringer;
    wherein the forward stringer is directly fixedly attached to respective forward rib sections of the rib sections of the ribs;
    wherein the aft stringer is directly fixedly attached to respective aft rib sections of the rib sections of the ribs; and
    wherein the central spar is directly fixedly attached to respective central rib sections of the rib sections of the ribs.

13. The aircraft wing of claim 1, as part of an aircraft, with the wing coupled to a fuselage of the aircraft.

14. The aircraft wing of claim 1, wherein the ribs extend from a leading edge of the wing to a trailing edge of the wing.

15. The aircraft wing of claim 2, wherein the flexible skin encloses the ribs.

16. The aircraft wing of claim 12,
    further comprising a trailing edge piece at a trailing edge of the wing;
    wherein the trailing edge piece is directly fixedly attached to respective trailing edge rib sections of the rib sections of the ribs.

17. The aircraft wing of claim 12, further comprising a flexible skin that encloses the ribs, the forward stringer, the aft stringer, and the central spar.

* * * * *